US012614833B2

(12) United States Patent
Zhang et al.

(10) Patent No.: US 12,614,833 B2
(45) Date of Patent: Apr. 28, 2026

(54) TIRE PRESSURE SENSORS AND TIRE VALVES

(71) Applicant: Hamaton Automotive Technology Co., Ltd, Hangzhou (CN)

(72) Inventors: Jianer Zhang, Hangzhou (CN); Zenan Hu, Hangzhou (CN); Lin Cai, Hangzhou (CN); Mingguang Yu, Hangzhou (CN); Jianing Shi, Hangzhou (CN); Zengchao Ji, Hangzhou (CN)

(73) Assignee: Hamaton Automotive Technology Co., Ltd, Hangzhou (CN)

( * ) Notice: Subject to any disclaimer, the term of this patent is extended or adjusted under 35 U.S.C. 154(b) by 66 days.

(21) Appl. No.: 18/549,809

(22) PCT Filed: Jul. 6, 2023

(86) PCT No.: PCT/CN2023/106121
§ 371 (c)(1),
(2) Date: Sep. 8, 2023

(87) PCT Pub. No.: WO2024/008155
PCT Pub. Date: Jan. 11, 2024

(65) Prior Publication Data
US 2025/0030147 A1 Jan. 23, 2025

(30) Foreign Application Priority Data
Jul. 6, 2022 (CN) .......................... 202221724815.0

(51) Int. Cl.
*H01Q 1/22* (2006.01)
*B60C 23/04* (2006.01)
*H01Q 11/08* (2006.01)

(52) U.S. Cl.
CPC ....... *H01Q 1/2241* (2013.01); *B60C 23/0452* (2013.01); *H01Q 11/08* (2013.01)

(58) Field of Classification Search
CPC ...... H01Q 1/2241; H01Q 11/08; H01Q 1/362; H01Q 1/40; H01Q 1/36; H01Q 9/28;
(Continued)

(56) References Cited

U.S. PATENT DOCUMENTS 11,964,520 B2 * 4/2024 Lee ..................... B60C 23/0494
2010/0176969 A1 7/2010 Buck et al.
(Continued)

FOREIGN PATENT DOCUMENTS

CN 103909791 A 7/2014
CN 108146157 A 6/2018
(Continued)

OTHER PUBLICATIONS

CN-215153707-U Translation (Year: 2012).*
(Continued)

*Primary Examiner* — Dameon E Levi
*Assistant Examiner* — Gurbir Singh
(74) *Attorney, Agent, or Firm* — Carroll, Hoette & Butscher, LLC; Christopher R. Carroll

(57) ABSTRACT

A tire pressure sensor includes: a printed circuit board, a battery and a helical antenna assembly, processed through an injection molding process to produce a sensor assembly. The helical antenna assembly includes an antenna support and a helical antenna on an outer sidewall of the antenna support. The antenna support is internally hollow, and a helical groove is on the outer sidewall of the antenna support. The helical antenna is wound in the helical groove. A plurality of fasteners for fixing the circuit board is at a bottom of the antenna support. A pressure sensing component and an antenna matching circuit are printed on a printed circuit
(Continued)

board. The antenna matching circuit is configured to transmit a radio frequency signal which is output by the pressure sensing component and obtained by the pressure sensing component modulating a sensed tire pressure signal to an input end of the helical antenna.

19 Claims, 5 Drawing Sheets

(58) Field of Classification Search
CPC ............ B60C 23/0452; B60C 23/0496; B60C 23/0493; B60C 23/0494; G01L 17/00
See application file for complete search history.

(56) References Cited

U.S. PATENT DOCUMENTS

| | | | |
|---|---|---|---|
| 2018/0154708 A1 | 6/2018 | Yang et al. | |
| 2021/0402833 A1* | 12/2021 | Avalur Nagarajan | ....................... B60C 23/0496 |
| 2023/0166570 A1* | 6/2023 | Destraves | ............... G01L 17/00 152/152.1 |

FOREIGN PATENT DOCUMENTS

| | | | | |
|---|---|---|---|---|
| CN | 215153707 U | * | 12/2021 | ......... B60C 23/0493 |
| CN | 217158622 U | | 8/2022 | |
| EP | 2465712 A1 | * | 6/2012 | ......... B60C 23/0496 |

OTHER PUBLICATIONS

CN-215153707-U Translation (Year: 2021).*

ISA State Intellectual Property Office of the People's Republic of China, International Search Report Issued in Application No. PCT/CN2023/106121, Oct. 27, 2023, WIPO, 5 pages. (Submitted with Machine Translation).

ISA State Intellectual Property Office of the People's Republic of China, Written Opinion of the International Searching Authority Issued in Application No. PCT/CN2023/106121, Oct. 27, 2023, WIPO, 8 pages. (Submitted with Machine Translation).

State Intellectual Property Office of the People's Republic of China, Notification of Correction Issued in Application No. 2023217881415, Dec. 6, 2023, 3 pages. (Submitted with Machine Translation).

European Patent Office, Extended European Search Report Issued in Application No. 23762359.0, Aug. 29, 2024, Germany, 8 pages.

* cited by examiner a                    b                    c

TIRE PRESSURE SENSORS AND TIRE VALVES

This application is a national stage of international PCT Application No. PCT/CN2023/106121 filed on Jul. 6, 2023, and claims a priority to a Chinese Patent Application with the corresponding application number being 202221724815.0 and the application date being Jul. 6, 2022, the entire contents of which are incorporated herein by reference.

TECHNICAL FIELD

The present disclosure relates to a field of vehicle technologies, and in particular to tire pressure sensors and tire valves.

BACKGROUND

This application claims priority to Chinese Patent Application No. 202221724815.0 filed on Jul. 6, 2022, where the Chinese patent application has the publication date of Aug. 9, 2022, the publication number of CN217158622U and the publication language of Chinese. The Chinese patent application is referred to as the priority application of the present application below.

Tire Pressure Monitor System (TPMS) has the function of performing real-time automatic monitoring on a tire pressure during a travel process of a vehicle and giving a warning on tire leakage and low pressure, so as to ensure vehicle travel safety. The TPMS mainly includes a tire pressure sensor (or referred to as TPMS sensor), a Microcontroller Unit (MCU), a radio frequency module and an antenna.

At present, the tire pressure sensor usually is a wireless sensor, that is, after collecting relevant signals of tire pressure and other parameters the tire pressure sensor will encode and modulate the signals into a radio frequency signal and then transmit the radio frequency signal through an antenna, such that a receiving device of a vehicle-machine system receives the radio frequency signal and decodes it to obtain a parameter value collected by the tire pressure sensor. The antenna as a key component in the tire pressure sensor is of great importance for the radio frequency signal transmission efficiency and the operation stability of the sensor.

In the related arts, antennas such as IFA (Inverted-F antenna), PIFA (Planar Inverted-F Antenna) and loop antenna (namely, the antenna contains a signal feed point and the end of the antenna is directly earthed or AC earthed) are usually employed. However, these types of antennas usually have a large size and correspondingly, limited by these large-size antennas, the tire pressure sensors have to be large in volume and weight, leading to much inconvenience in production and use. Furthermore, for a conventional TPMS sensor, various components are usually assembled in a prefabricated housing, which brings complex assembling steps and low assembling efficiency due to small space of the housing. In addition, there may be gaps between various assembled components that make the sensor less resistant to vibration, further affecting the signal transmission stability or even causing damage to the sensor.

SUMMARY

In view of this, in order to address the problems in the related arts, the present disclosure provides a tire pressure sensor and a tire valve. The technical solution of the present disclosure is described below.

According to a first aspect of embodiments of the present disclosure, there is provided a tire pressure sensor, including a sensor assembly obtained through an injection molding process, where the sensor assembly includes a printed circuit board, a battery and a helical antenna assembly, wherein, battery pins of the battery are connected with corresponding power supply pins of the printed circuit board respectively;

the helical antenna assembly includes an antenna support and a helical antenna on an outer sidewall of the antenna support, the antenna support is internally hollow, a helical groove is provided on the outer sidewall of the antenna support, the helical antenna is wound into the helical groove, and a plurality of fasteners for fixing the circuit board are at the bottom of the antenna support;

a pressure sensing component and an antenna matching circuit are printed on the printed circuit board, and the antenna matching circuit is configured to transmit to an input end of the helical antenna a radio frequency signal which is output by the pressure sensing component and obtained by the pressure sensing component modulating a sensed tire pressure signal.

In some embodiments, the battery pins of the battery are connected with corresponding power supply pins of the printed circuit board respectively.

In some embodiments, a protective body wrapping the printed circuit board, the battery and the helical antenna assembly is formed during the injection molding process, and there is an air hole on the protective body disposed at a position corresponding to a pressure sensing hole of the pressure sensing component.

In some embodiments, the tire pressure sensor further includes a base and a housing mounted on the base, where a sealed cavity for accommodating the sensor assembly is formed between the base and the housing, a pressure transmission through-hole in communication with the sealed cavity is on the base, and an air channel communicating the pressure transmission through-hole and the air hole is formed inside the sealed cavity.

In some embodiments, the air channel is formed by sequentially communicating a first air channel, a second air channel and a third air channel, where, the first air channel is formed between an end surface at a side of the protective body towards the base and a bottom surface of the base;

the second air channel is formed between an outer sidewall of the protective body and an inner sidewall of the housing;

the third air channel is formed between an end surface at a side of the protective body away from the base and an inner wall of an end of the housing.

In some embodiments, a plurality of protrusions are formed on the end surface at the side of the protective body towards the base, and the first air channel between the protective body and the bottom surface of the base is formed by the plurality of protrusions;

a plurality of grooves are formed on the inner sidewall of the housing, and the second air channel between the outer sidewall of the protective body and the inner sidewall of the housing is formed by the plurality of grooves; and/or, a gap portion is formed on the end surface at the side of the protective body away from the base, and the third air channel between the protective body and the inner wall of the end of the housing is formed by the gap portion.

In some embodiments, an absolute value of a difference between an included angle between air flow directions of the second air channel and the first air channel and 90° is equal or less than a first threshold; and/or, an absolute value of a difference between an included angle between air flow directions of the second air channel and the third air channel and 90° is equal or less than a second threshold.

In some embodiments, a buffer recess portion in communication with the air hole is further formed at the end surface at the side of the protective body away from the base.

In some embodiments, the helical antenna and the pressure sensing hole of the pressure sensing component both face toward a side away from the base.

In some embodiments, the sensor assembly is integrally formed by the printed circuit board, the battery and the helical antenna assembly through the injection molding process; or, a plurality of injection molding accessories are obtained by the printed circuit board, the battery and the helical antenna assembly processing through the injection molding process and then spliced to form the sensor assembly.

In some embodiments, the injection molding process is a low-pressure injection molding process.

In some embodiments, an injection molding material of the low-pressure injection molding process is thermoplastic polyamide.

In some embodiments, the pressure sensing component is a sensor chip integrated with a pressure sensing component.

In some embodiments, the sensor chip is further integrated with a temperature sensing component, an acceleration sensing component and/or an angle sensing component.

In some embodiments, the radio frequency signal which is output by the pressure sensing component and obtained by the pressure sensing component modulating the sensed tire pressure signal includes:

a frequency shift keying (FSK) signal output by performing FSK modulation on the tire pressure signal; or, an amplitude shift keying (ASK) signal output by performing ASK modulation on the tire pressure signal.

In some embodiments, the helical antenna includes a first pin and a second pin, the first pin is used as an input end of the helical antenna and the second pin is suspended, wherein, an axial groove is provided on the antenna support, there is a welding hole on the printed circuit board disposed at a position vertically corresponding to the axial groove, and the first pin is welded through the welding hole to an output end of the antenna matching circuit.

In some embodiments, the battery is a button cell and a specification of the button cell is BR1632, CR1632, BR1620, CR1620, BR1225, CR1225, BR1220 or CR1220.

According to a second aspect of embodiments of the present disclosure, there is provided a tire valve, on which the tire pressure sensor as mentioned in any one item of the first aspect is assembled.

The technical solutions provided by the embodiments of the present disclosure at least have the following beneficial effects.

In the present disclosure, in the tire pressure sensor, the sensor assembly is obtained by a printed circuit board, a battery and a helical antenna assembly processed through one or more injection molding processes; further, a pressure sensing component and an antenna matching circuit are printed on the printed circuit board, where the antenna matching circuit is connected to the pressure sensing component and the helical antenna respectively. The pressure sensing component senses a tire pressure and outputs a radio frequency signal through modulation, and then the antenna matching circuit performs tuning and impedance conversion on the radio frequency signal and transmits it to surrounding space through the helical antenna.

As can be seen, on one hand, in the technical solution, the large-size antennas such as IFA, PIFA and loop antenna usually employed in the related arts are rejected, but the helical antenna disclosed in the priority application is used as an antenna in the tire pressure sensor. Compared with the conventional TPMS sensor using the above large-size antenna, the tire pressure sensor herein is miniaturized to have a smaller volume and a lighter weight. Further, in the production stage, the parameters of the antenna matching circuit and the helical antenna can be adjusted such that the radio frequency signal sent by the tire pressure sensor has the characteristics of high bandwidth and good gain, thereby realizing more stable and more efficient signal transmission. On the other hand, in the production stage, the sensor assembly is obtained through one or more injection molding processes, which makes the entire structure and assembling steps of the sensor assembly simple. In addition, it can be guaranteed that the finally-assembled tire pressure sensor has a compact internal structure, which enables the sensor to be more resistant to vibration and have higher signal transmission stability.

It should be understood that the above general descriptions and subsequent detailed descriptions are merely illustrative and explanatory rather than limiting of the present disclosure.

BRIEF DESCRIPTION OF DRAWINGS

To describe the technical solutions in the embodiments of the present disclosure more clearly, drawings required in descriptions of the embodiments of the present disclosure or the related art will be briefly introduced below. It is apparent that the drawings described below are merely embodiments of the present disclosure and other drawings may be obtained by those of ordinary skill in the prior art based on these drawings without making creative work.

Figure 1:
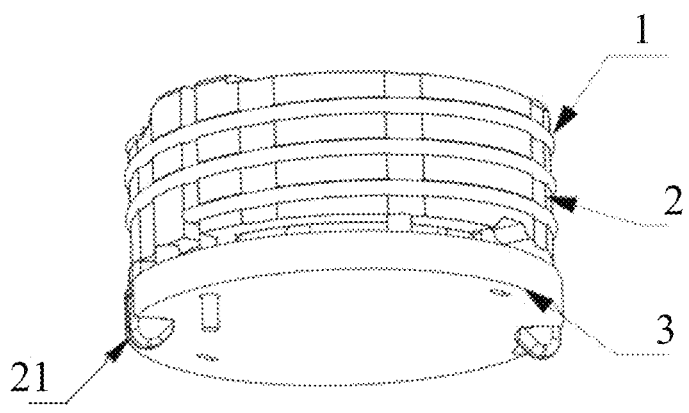
FIGS. 1, 2 and 3 are structural diagrams illustrating a helical antenna assembly.

The numerals of the drawings are described below: 1. helical antenna, 11. first pin, 12. second pin, 2. antenna support, 21. fastener, 22. helical groove, 23. axial groove, 24. wedge-shaped groove, 25. position limiting piece, 3.

printed circuit board, 31. pressure sensing component, 311. pressure sensing hole, 32. antenna matching circuit, 33. welding hole, 34. pin through-hole, 35. recess portion for snap-fit, 4. battery, 41. battery pin, 5. protective body, 51. air hole, 52. protrusion, 53. gap portion, 54. buffer recess portion, 6. base, 61. pressure transmission through-hole, 62. flange, 63. sealing ring, 7. housing, 71. groove, 72. step, 8. tire valve, 81. connection nut, 82. thread, 83 valve cap, 9. sensor assembly, 10. helical antenna assembly, where the helical antenna assembly 10 is the helical antenna assembly disclosed in the priority application.

DETAILED DESCRIPTION

In order to help persons of ordinary skills in the prior arts to better understand the technical solutions of the present disclosure, the technical solutions in the embodiments of the present disclosure will be fully and clearly described below in combination with drawings.

It is to be noted that the terms such as "first" and "second" in the specification, the claims and the drawings of the present disclosure are used to distinguish similar objects and are not necessarily used to describe a particular sequence or order. It should be understood that the data used this way can be exchanged such that the embodiments of the present disclosure described herein can be carried out in a sequence other than the sequences illustrated or described herein. The embodiments described in the following examples do not represent all embodiments consistent with the present disclosure. Rather, they are merely examples of apparatuses and methods consistent with some aspects of the present disclosure as detailed in the appended claims.

A tire pressure sensor provided by the present disclosure includes a sensor assembly 9 obtained through an injection molding process, and the sensor assembly 9 includes a printed circuit board 3, a battery 4 and a helical antenna assembly 10, where, > battery pins 41 of the battery 4 are connected with corresponding power supply pins of the printed circuit board 3 respectively;
>
> the helical antenna assembly 10 includes an antenna support 2 and a helical antenna 1 on an outer sidewall of the antenna support 2; the antenna support 2 is internally hollow; a helical groove 22 is provided on the outer sidewall of the antenna support 2; the helical antenna 1 is wound into the helical groove 22; a plurality of fasteners 21 for fixing the circuit board are at the bottom of the antenna support 2; a pressure sensing component 31 and an antenna matching circuit 32 are printed on the printed circuit board 3; and the antenna matching circuit 32 is configured to transmit to an input end of the helical antenna 1 a radio frequency signal which is output by the pressure sensing component 31 and obtained by the pressure sensing component modulating a sensed tire pressure signal.

In the present disclosure, in the tire pressure sensor, the sensor assembly 9 is formed by the printed circuit board 3, the battery 4 and the helical antenna assembly 10 with an injection molding process; further, the pressure sensing component 31 and the antenna matching circuit 32 are printed on the printed circuit board 3, where the antenna matching circuit 32 is connected to the pressure sensing component 31 and the helical antenna 1 respectively. The pressure sensing component 31 senses a tire pressure and outputs a radio frequency signal through modulation, and then the antenna matching circuit 32 performs tuning and impedance conversion on the radio frequency signal and transmits it to surrounding space through the helical antenna 1.

As can be seen, on one hand, in the technical solution, the large-size antennas such as IFA, PIFA and loop antenna usually employed in the related arts are rejected, but the helical antenna 1 disclosed in the priority application is used as an antenna in the tire pressure sensor. Compared with the conventional TPMS sensor using the above large-size antenna, the tire pressure sensor herein is miniaturized to have a smaller volume and a lighter weight. Further, in the production stage, the parameters of the antenna matching circuit 32 and the helical antenna 1 can be adjusted such that the radio frequency signal sent by the tire pressure sensor has the characteristics of high bandwidth and good gain, thereby realizing more stable and more efficient signal transmission. On the other hand, in the production stage, the sensor assembly 9 is obtained through an injection molding process, which makes the entire structure and assembling steps of the sensor assembly 9 simple. In addition, it can be guaranteed that the finally-assembled tire pressure sensor has a compact internal structure, which enables the sensor to be more resistant to vibration and have higher signal transmission stability.

Figure 7:
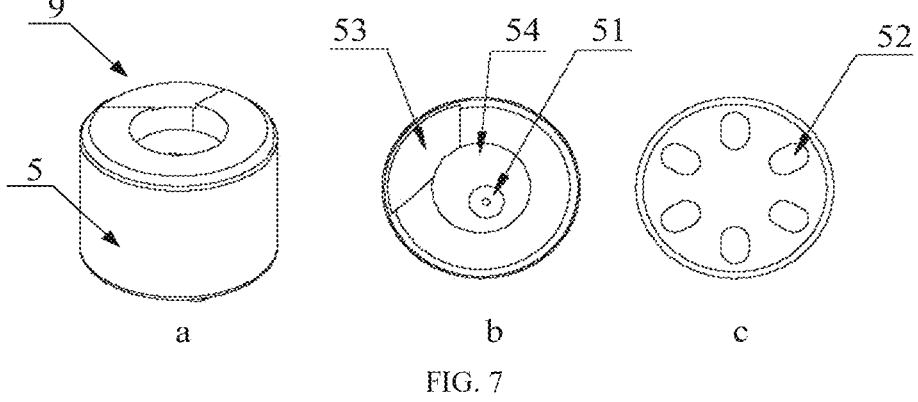
FIG. 7 shows a stereoscopic view a, a top view b and a bottom view c illustrating a sensor assembly in a tire pressure sensor disclosed in the application.

In this solution, the sensor assembly 9 is obtained by the printed circuit board 3, the battery 4 and the helical antenna assembly 10 processing through an injection molding process. As shown by a of FIG. 7, a protective body 5 at the outermost side of the sensor assembly 9 is obtained by injection molding process. Specifically, the sensor assembly 9 can be obtained by multiple injection molding processes.

For example, for the printed circuit board 3, the battery 4 and the helical antenna assembly 10 (formed by assembling the helical antenna 1 and the antenna support 2), a plurality of injection molding accessories can be firstly obtained by the injection molding process, and then spliced to form the sensor assembly 9. The connection manner for connecting the plurality of injection molding accessories can include but not limited to gluing, thread connection, snap-fit connection and performing secondary injection molding on the injection molding accessories to melt their contact surfaces for bonding and the like, which is not limited in the present disclosure. It can be understood that the above injection molding accessories have their respective wrapping parts (that is, after the injection molding is completed, parts wrapping around the corresponding accessories are obtained by solidifying the injection molding material). After the connection is completed, the wrapping parts of the injection molding accessories can be mutually connected to form the entirety of the protective body 5. Furthermore, any injection molding accessory can include at least one part. For example, a first injection molding accessory is obtained by performing injection molding on the helical antenna assembly 10, and a second injection molding accessory is obtained by performing injection molding on the printed circuit board 3 and the battery 4, and then the first injection molding accessory and the second injection molding accessory are connected integrally to form the sensor assembly 9 with the first injection molding accessory above the second injection molding accessory. In some embodiments, three injection molding accessories can be obtained by performing injection molding on the printed circuit board 3, the battery 4 and the helical antenna assembly 10 respectively, and then the three injection molding accessories are connected to form the sensor assembly 9. The total number of the injection molding accessories and the specific components included in any one of the plurality of injection molding accessories are not limited in the present disclosure and can be determined reasonably based on actual situations such as processing difficulty, error requirements and processing efficiency. Therefore, no redundant descriptions are made herein.

Figure 8:
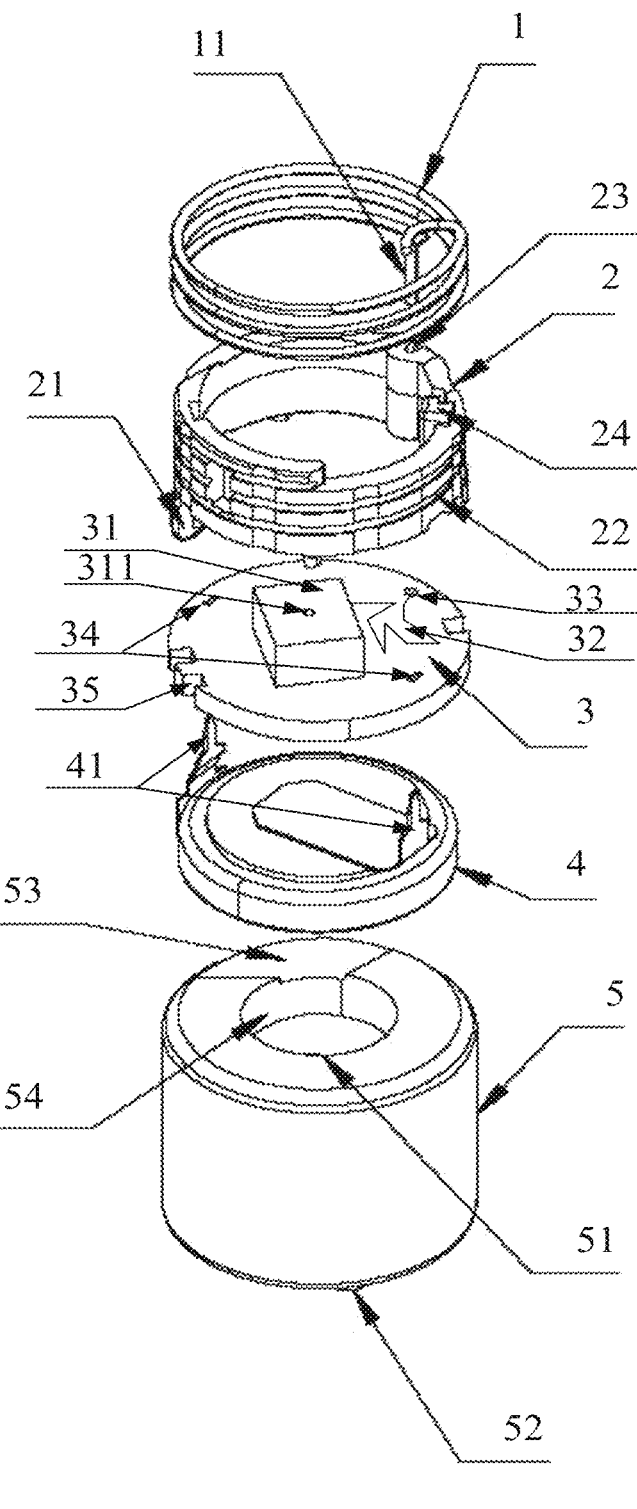
FIG. 8 is an exploded view a sensor assembly in a tire pressure sensor disclosed in the application.

For another example, the printed circuit board 3, the battery 4 and the helical antenna assembly 10 (formed by assembling the helical antenna 1 and the antenna support 2) can also be integrally formed into the sensor assembly 9 through an injection molding process. In this way, the protective body 5 accommodating the printed circuit board 3, the battery 4 and the helical antenna assembly 10 can be formed through one injection molding process, the injection molding process involves fewer steps, and the entire structure of the sensor assembly 9 obtained by the injection molding process is more compact. During a production process of the sensor assembly 9, the printed circuit board 3, the battery 4 and the helical antenna assembly 10 can be placed into an injection mold based on a pre-designed relative position relationship and then subjected to injection molding operation. The relative position relationship is as shown in FIG. 8. After the injection molding is completed, the protective body 5 accommodating the printed circuit board 3, the battery 4 and the helical antenna assembly 10 can be formed at one time. At this time, the protective body 5 and the printed circuit board 3, the battery 4 and the helical antenna assembly 10 wrapped inside the protective body 5 can be entirely referred to as the sensor assembly 9. Obviously, since the protective body 5 can fully wrap the printed circuit board 3, the battery 4 and the helical antenna assembly 10, the sensor assembly 9 with compact internal structure can be formed with a relatively smaller component volume (the component volume is equal to the volume of the protective body 5), achieving the beneficial effects of water proofness (satisfy the waterproof requirements of IP67 and IP69K and the like), dust proofness, vibration resistance, and high pressure resistance and the like for the internal elements of the sensor assembly. Further, the tire pressure sensor is made to have a higher integration degree and is suitable for mass production. In addition, the assembled tire pressure sensor has stable signal and high reliability and thus can work normally under various harsh working conditions.

In an embodiment, there is an air hole 51 on the protective body 5 disposed at a position corresponding to a pressure sensing hole 311 of the pressure sensing component 31. The air hole 51 is configured to direct air (conveyed from the below-described air channel) to the pressure sensing hole 311 of the pressure sensing component 31, such that a pressure sensing device inside the pressure sensing hole 311 senses and detects an air pressure. Alternatively, in addition to the air hole 51 on the protective body 5, no end surface is manufactured at a position at a side of the protective body 5 away from a base 6 during the injection molding process, and thus, an opening is formed on this end surface to facilitate conveying the air. The following descriptions are made still with the air hole 51 as an example.

Furthermore, the injection molding process can be a low-pressure injection molding (LPM) process. Compared with the conventional high-pressure injection molding (HLM) process, the injection molding material (e.g., hot melt adhesive) employed in the low-pressure injection molding process has a lower melting point and a lower viscosity. Thus, an injection temperature and an injection pressure required for the low-pressure injection molding process are lower. For example, the injection temperature required by the low-pressure injection molding process is only 190° C. to 230° C., which is well below the injection temperature (230° C. to 300° C.) required by the high-pressure injection molding process; further, the injection pressure required by the low-pressure injection molding process is only 1.5 bar to 40 bar. Hence, in the present disclosure, when the sensor assembly is manufactured through the low-pressure injection molding process, those unfavourable effects or even damages caused by high temperature and high pressure to the helical antenna assembly 10, the printed circuit board 3 and the battery 4 can be avoided, thus increasing the yield of the sensor assembly 9 to some degree.

In the low-pressure injection molding process, an injection molding material having good mechanical properties (for example, has elastic, waterproof, heat insulation and flameproof performances while having ruggedness performance) and electric properties (for example, insulation and low dielectric constant and the like) can be used. Illustratively, thermoplastic polyamide can be used as an injection molding material, for example, thermoplastic polyamide with a model being TECHNOMELT PA 646 (e) is used. Due to low viscosity of the material, it can be processed and injected under a low pressure. This material can package the sensor in a sealing manner without damaging the internal devices and will not generate poisonous smog during a processing procedure, ensuring safety and human friendliness. Of course, other types or other models of injection molding materials can be selected based on actual situations, which is not limited in the present disclosure. Furthermore, considering the injection molding material usually has a relative dielectric constant, this parameter can affect the signal of the helical antenna 1. Since the polyamides produced in different production environments, for example, by different manufacturers in different batches under different processes may have different relative dielectric constants, in combination with the above antenna matching circuit 32, reasonable selection can be performed with the dielectric constant as the parameter of the polyimide, for example, the polyimide with the dielectric constant less than 4.2 can be used as an injection molding material.

Figure 4:
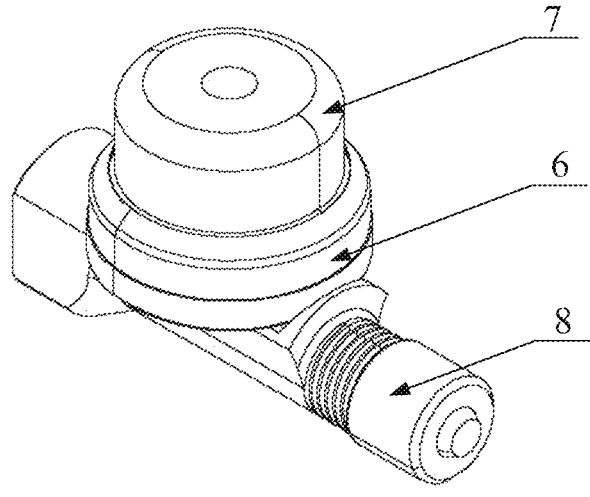
FIG. 4 is a schematic diagram illustrating an assembling structure of a tire pressure sensor and a tire valve disclosed in the application.
Figure 5:
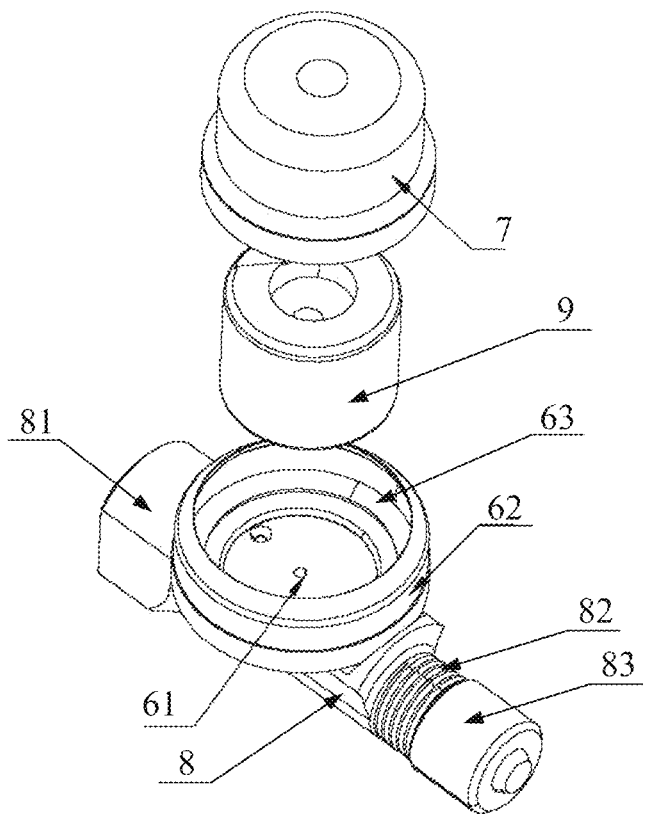
FIG. 5 is an exploded view of a tire pressure sensor and a tire valve disclosed in the application.

The assembly structure of the tire pressure sensor and a tire valve is shown in FIG. 4. As shown in FIG. 4, a base 6 is on the tire valve 8, and a housing 7 is mounted on the base 6. A sealed cavity for accommodating the sensor assembly 9 is formed between the base 6 and the housing 7, with the exploded view of the specific structure shown in FIG. 5. As shown in FIG. 5, a pressure transmission through-hole 61 is provided in the base 6, and the pressure transmission through-hole is in communication with an air chamber (not shown) penetrating the tire valve 8, and an air channel communicating the pressure transmission through-hole 61 and the air hole 51 is formed in the sealed cavity. The tire valve 8 can be connected to a tire of a vehicle through a connection nut 81, for example, the connection nut 81 can be matched with a thread on the original tire valve of the tire to realize the connection. After the connection is completed, the pressure transmission through-hole 61 can communicate with the interior of the tire of the vehicle through the air chamber.

The other end of the tire valve 8 away from the connection nut 81 can be further provided with a thread 82 which is configured to connect with other devices to facilitate functional expansion. For example, after the tire valve 8 is connected to the tire through the connection nut 81, extensions such as air inflation, deflation and connection with other detection devices etc. can be performed through the thread 82. Apparently, by setting the thread 82, it is unnecessary to remove the tire valve 8 (i.e., that is, it is unnecessary to disconnect the connection between the connecting nut 81 and the original tire valve of the tire) in the actual use process, and extension function can be realized on the basis of tire valve 8 which is more convenient for users to use.

Furthermore, it can be known from the above structure that after the tire pressure sensor is assembled, the tire valve 8 and the sensor assembly 9 form a three-way structure for the air with the pressure transmission through-hole 61 as center. The tire valve 8 (and its internal air chamber) shown in FIG. 5 is of straight line shape. It is to be understand that this straight line shape is only one feasible manner to implement the three-way structure. In solution implementation, the tire valve 8 can also be of another shape and the specific shape of the three-way structure is not limited in the present disclosure. Illustratively, as shown in FIG. 5, the tire valve 8 can be divided, with the pressure transmission through-hole 61 as a division point, into a first part close to the connection nut 81 and a second part close to the thread 82. For the above two parts, with the pressure transmission through-hole 61 as center, the first part is deflected 90 degrees along a direction away from the base 6 such that the central line of the internal air chamber of the deflected second part coincides with or approximates to the central line of the sensor assembly 9. Thus, the tire valve 8 itself is transformed into L shape whereas the tire valve 8 and the entirety formed by a third part (formed by the base 6, the sensor assembly 9 and the housing 7) are shaped like T. As a result, on one hand, it can be guaranteed that the deflected second part can still have the above extension function; on the other hand, the deflected second part and the third part where the base is located are located at both sides of the central line of the internal air chamber of the first part respectively, that is, the second part and the third part are symmetric around the central line of the internal air chamber of the first part. Thus, the weights of the two parts can be counteracted mutually (at least partially), such that the center of gravity of the tire valve 8 provided with the tire pressure sensor is located on the central line of the internal air chamber of the first part (or approximate to the central line as possible). In this way, the tire valve 8 mounted on the tire can be prevented from deviating aside, thus avoiding wear of a side of the interior of the tire.

The base 6 is usually made of a metal material. Further, in order to tightly connect the base 6 with the tire valve 8, the base 6 can be welded or thread-connected with the tire valve 8, or even the tire valve 8 and the base 6 are integrally formed during the production process of the tire valve 8. As a result, no redundant descriptions are made herein.

The housing 7 is mounted on the base 6 and a sealed cavity for accommodating the sensor assembly 9 is formed between the base 6 and the housing 7, where the sealed cavity is in communication with the pressure transmission through-hole 61. The sensor assembly 9 is located inside the sealed cavity and an air channel for communicating the pressure transmission through-hole 61 and the air hole 51 is formed in the sealed cavity.

Figure 2:
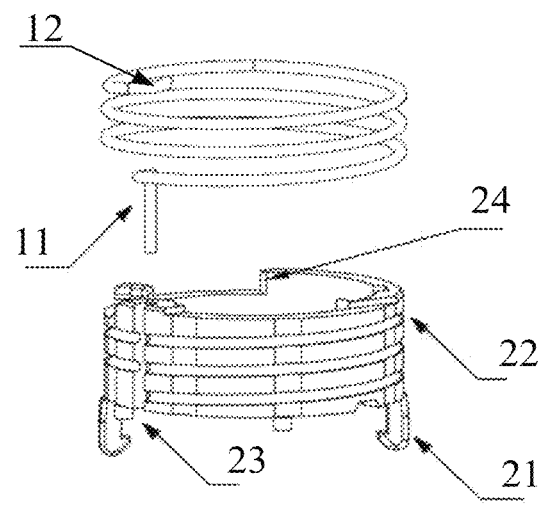
Figure 3:
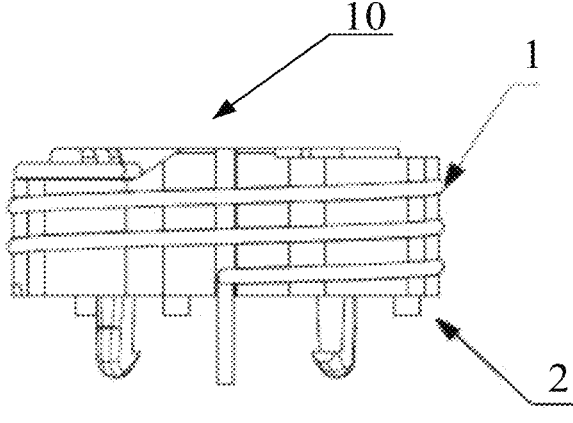

As shown in FIGS. 1, 2 and 3, the helical antenna assembly 10 includes an antenna support 2 and a helical antenna 1 on an outer sidewall of the antenna support 2; the antenna support 2 is internally hollow; a helical groove 22 is provided at the outer sidewall of the antenna support 2; the helical antenna 1 is, after being shaped, wound into the helical groove 22, that is, the helical antenna 1 and the antenna support 2 are assembled integrally.

In some practical applications, the antenna support 2 is manufactured in advance and then a wire is wound on the antenna support 2 along the helical groove 22 by hand or wound automatically by a machine so as to form the helical antenna 1, and thus, the helical antenna 1 and the antenna support 2 are assembled integrally. Alternatively, the helical antenna 1 and the antenna support 2 can also be integrally formed through an injection molding process, for example, the helical antenna 1 can be placed into an injection mold for injection molding and after the injection molding, the antenna support 2 on which the helical antenna 1 is wound is formed. Fasteners 21 for fixing the circuit board can be disposed at the bottom of the antenna support 2. The fasteners 21 can be disposed radially symmetrically. The fasteners 21 can be provided with hooks opposed to each other along a direction toward the axial center, so as to hook the circuit board. The bottoms of the hooks can be wedge-shaped, and a plurality of adjacent wedge-shaped hooks form a guide slide groove for guiding the mounting of the circuit board, bringing conveniences to the mounting work. There may be at least two (for example, two, four, six etc.) fasteners 21, and certainly, there may be an odd number (for example, five, three etc.) of fasteners which are uniformly arranged annularly, which is not limited in the present disclosure.

An axial groove 23 penetrating through upper and lower ends is on an outer sidewall of the antenna support 2, the axial groove is connected (longitudinal intersected) with the helical groove, and a first pin 11 of the helical antenna 1 is adapted to the axial groove 23. A position limiting piece 25 adapted to the helical antenna is on an upper end of the antenna support 2. In this case, an end of the helical antenna 1 is bent and then positioned in cooperation with the position limiting piece 25, and the other end of the helical antenna 1 is positioned through cooperation of the first pin 11 and the axial groove 23, thus conveniently positioning the helical antenna 1 on the antenna support 2.

A wedge-shaped groove 24 adapted to the helical antenna can be disposed on the upper end of the antenna support 2, and a line distance of the helical groove 22 can be no less than 0.8 mm and no greater than 1.5 mm.

In an embodiment, the helical antenna 1 is formed by winding a wire. In order to controlling the volume of the helical antenna 1 to achieve miniaturization of the sensor while ensuring good signal strength of the sensor, a wire with a diameter no less than 0.3 mm and no greater than 0.7 mm can be selected, and meanwhile, a number of turns of the wire wound can be no less than 2 turns and no greater than 5 turns. Furthermore, a material of the wire can be copper, and good signal transmission effect can be achieved by using the excellent conductivity of the copper.

In an embodiment, the pressure sensing component can also have a microcontroller unit (MCU) and a signal modulating module. The MCU is configured to control the operation of the tire pressure sensor and process a collected pressure signal, for example, input the collected pressure signal into the signal modulating module in the form of binary data, and the module loads the pressure signal through modulation process to a carrier signal so as to obtain a radio frequency signal, and then output the radio frequency signal to an input end of the antenna matching circuit 32, and then the antenna matching circuit 32 performs tuning and impedance conversion on the radio frequency signal and transmits it to surrounding space through the helical antenna 1. In this way, the radio frequency signal output through modulation can be used to transmit the collected tire pressure signal to the antenna matching circuit 32.

In an embodiment, the pressure sensing component 31 can perform several types of modulations on the sensed tire pressure signal and output the corresponding radio frequency signals. For example, the pressure sensing component 31 can perform Frequency Shift Keying (FSK) modulation on the tire pressure signal and output a modulated FSK signal. For another example, the pressure sensing component 31 can perform Amplitude Shift Keying (ASK) modulation on the tire pressure signal and output a modulated ASK signal.

In an embodiment, the pressure sensing component 31 can be a sensor chip which is integrated with a pressure sensing component. Based on different pressure sensing principles, the pressure sensing component can take several forms, for example, can be a piezoresistance type sensing component, a strain type sensing component (or called strain gauge), a piezoelectric sensing component, a piezocapacitive sensing component or a potentiometric sensing component or the like, which is not limited in the present disclosure. Furthermore, the sensor chip can be integrated with at least one signal modulation circuit (e.g., the above signal modulating module), and thus, the chip can work under different modes as required to output the modulated signals of corresponding types. Illustratively, it is supposed that the sensor chip is internally integrated with an FSK modulating module (corresponding to FSK mode) and an ASK modulating module (corresponding to ASK mode). During the operation of the tire pressure sensor, if it is required to perform FSK modulation on a collected tire pressure signal, the chip should work under the FSK mode to call the internal FSK modulating module to perform FSK modulation on the tire pressure signal to generate and output an FSK signal. The specific working mode of the sensor chip can correspond to the connected antenna matching circuit, and can be set at a proper timing before or after the senor chip is printed on the printed circuit board. As shown in FIG. 8, a pressure sensing hole 311 can be disposed at a position corresponding to the pressure sensing device (not shown) on the pressure sensing component 31. The pressure sensing hole 311 is in communication with the interior of the tire through the air channel, such that the pressure inside the tire can be transmitted to the pressure sensing hole and sensed by the pressure sensing device below, so as to achieve pressure detection.

Furthermore, the sensor chip can be further integrated with a temperature sensing component, an acceleration sensing component and/or an angle sensing component. Hence, the tire pressure sensor can, when detecting a tire pressure, detect physical parameters of the tire such as temperature, acceleration and/or angle so as to achieve a function integration into a single sensor, helping reduce the number of the sensors. Since the tires can rotate around the axis center during the travel of the vehicle and an included angle between a plane where the circular contour of the tires is located and the ground surface can reflect a direction and a degree of inclination of the tires and the like, the position of the angle sensing component in the tire pressure sensor can be reasonably designed to accurately detect the above angle of the tires, so as to provide direct data support for the vehicle-machine system to obtain states such as a vehicle steering angle and left and right inclinations and the like.

Illustratively, the sensor chip with the model being MLX91804, SP40T or NTM88xxx5 or the like can be used as the pressure sensing component 31. These sensor chips can also be integrated with a detection function for other parameters such as temperature, so as to reduce the number of electric elements printed on the printed circuit board 3 by function integration, further saving the precious space of the printed circuit board 3 and helping the miniaturization. Furthermore, the signal output by the above temperature sensing component, the acceleration sensing component and/or the angle sensing component can also be modulated by the above signal modulating module as a radio frequency signal and then output, which will not be described again herein.

Figure 9:
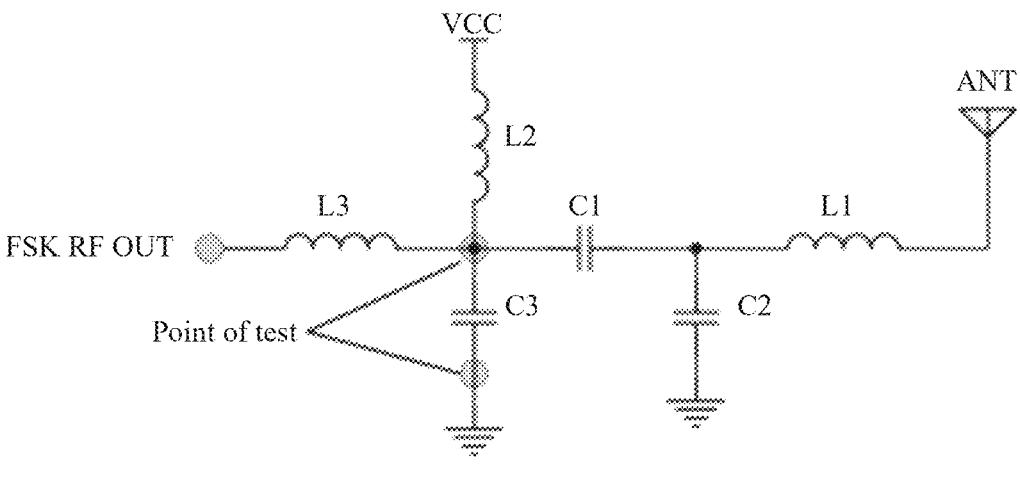
FIG. 9 is a principal diagram illustrating an antenna matching circuit printed on a printed circuit board in a tire pressure sensor disclosed in the application.

FIG. 9 is a principal diagram illustrating an antenna matching circuit 32. As shown in FIG. 9, with FSK modulation as an example, "FSK RF OUT" represents a signal output end of the pressure sensing component 31 to output a modulated FSK signal (the FSK signal essentially is a radio frequency signal). As mentioned above, if the pressure sensing component 31 is a pressure sensor chip, the chip can work under the FSK mode. In practice, a pressure sensing circuit can be set up on the printed circuit board 3 by using independent electronic elements (such as independent piezoelectric sheet, resistor, capacitor, inductor, wire and the like) to achieve pressure sensing and FSK signal modulation functions and thus the circuit can also serve as the pressure sensing component 31. At this time, the pressure sensing component 31 is not an independent chip but the entirety of the pressure sensing circuit set up by the above electronic elements. The subsequent descriptions are still made with the pressure sensing component 31 as the pressure sensor chip.

L3 and C1 form one series resonant network for performing filtering on a high-order harmonic. When the quality factor of the resonant network is sufficiently high, a current flowing through the network is an ideal sinusoidal signal. L2, L3 and C3 are a part of a Class-E amplifier in the chip. The value of the C3 is formed by two parts, where one part is a parasitic capacitance of a transistor inside the chip, and the other part is a capacitance actually introduced by the circuit board. The C3 can affect the RF efficiency. In the solution implementation, whether to weld C3 can be determined based on the entire situation of the circuit. For example, it is determined not to weld C3 to improve the RF efficiency. Furthermore, a π-network formed by C1, L1 and C2 is used for impedance conversion between the PA and the helical antenna 1. In some embodiments, another type of matching network, such as L and T type network can be used.

In an embodiment, the helical antenna 1 can include a first pin 11 and a second pin 12. The first pin 11 can be used as an input end of the helical antenna 1, and the second pin 12 is suspended, as shown in FIG. 2 and FIG. 8. An axial groove 23 can be disposed on the antenna support 2, and there is a welding hole 33 on the printed circuit board 3 disposed at a position vertically corresponding to the axial groove 23. With the disposal of the welding hole 33, the first pin 11 is welded through the welding hole 33 to an output end of the antenna matching circuit 32. Thus, the input end of the helical antenna 1 is electrically connected with the antenna matching circuit 32.

Battery pins 41 of the battery 4 are respectively connected with the corresponding power supply pins of the printed circuit board 3 to supply power to the printed circuit board 3. As shown in FIG. 8, pin through-holes 34 can also be provided at the positions corresponding to the battery pins 41 on the printed circuit board 3, such that the battery pins 41 can run through the corresponding pin through-holes 34 to connect (weld or press-connect or the like) with the corresponding power supply pins of the printed circuit board 3, promoting smooth progress of subsequent assembling steps.

In an embodiment, the battery 4 can be a button cell. In order to achieve possible sensor miniaturization, a small-size button cell can be used as possible. Illustratively, the specification and model of the button cell can be BR1632 (where "16" represents the diameter of the cell is 16 mm and "32" represents the thickness of the cell is 3.2 mm, same as below), CR1632, BR1620, CR1620, BR1225, CR1225, BR1220 or CR1220. Taking the button cell with the size parameter being "1225" as an example, compared with the conventional TPMS sensor, the radial diameter of the tire pressure sensor can be reduced by about 8 mm and the weight reduced by about ⅓ or more, effectively achieving miniaturization of the tire pressure sensor.

In an embodiment, a difference between a maximum diameter in circumferential outer diameters of the helical antenna 1 and a diameter of the battery 4 can be equal or less than a third threshold to reduce the volume and the desired space of the helical antenna 1. The third threshold can be a preset fixed value, for example, 1 mm, 0.5 mm or 0.2 mm or the like, which is not limited in the present disclosure. It is to be understood that by setting the third threshold reasonably, it can be guaranteed that the maximum diameter in the circumferential outer diameters of the helical antenna 1 is suited to the diameter of the battery 4 (that is, equal to or slightly greater than the diameter of the battery 4), and the assembled tire pressure sensor has compact internal structure, reducing vibration and wear.

In an embodiment, the tire pressure sensor can also include a base 6 and a housing 7 mounted on the base 6. The housing 7 can be made of a material such as plastic, which has less impact on signal transmission. A sealed cavity is formed between the base 6 and the housing 7. A pressure transmission through-hole 61 in communication with the sealed cavity is on the base 6. The sensor assembly 9 is placed in the sealed cavity and an air channel communicating the pressure transmission through-hole 61 and the air hole 51 is formed in the sealed cavity. An end of the air channel is the interior of the tire and the other end of the air channel is the air hole 51, and a position of the pressure sensing hole 311 corresponds to a position of the air hole 51. It can be seen that the air pressure inside the tire is transmitted through the air channel to the pressure sensing hole 311, such that the sensing device in the pressure sensing component 31 can accurately sense the pressure.

In some exemplary embodiments, the base 6 and the housing 7 can be mounted and sealed by the following structure: one circle of step 72 is formed on the housing 7, and a flange 62 deflected toward a center to press the step 72 so as to fix the base 6 to the housing 7 is formed at an opening of the base 6, and a sealing ring 63 is disposed between the base 6 and the housing 7 to form the above sealed cavity. In some other exemplary embodiments, the sealing ring 63 can be placed inside the base 6 and the housing 7 is inserted into the base 6, and the flange 62 deflected toward the center is formed through a riveting process at the opening of the base 6 to press the step 72. In this way, on one hand, the fixing of the base 6 on the housing 7 can be achieved, and on the other hand, a riveting pressure can be conveyed to the sealing ring 63, such that the sealing ring 63 is deformed under the pressure to further enhance the sealing effect.

In an embodiment, since the sensor assembly 9 which is not fully hollow is placed in the sealed cavity, and the outer sidewall and the end surface of the protective body 5 of the sensor assembly 9 are in contact with the housing 7 or closest to the housing 7, the above air channel can be formed between the protective body 5 and the housing 7. Further, due to the special shapes of the proactive body 5 and the housing 7, the air channel is not linearly shaped but bent. In some embodiments, the above air channel can be formed by sequentially communicating a first air channel, a second air channel and a third air channel, where the first air channel is formed between an end surface at a side of the protective body 5 towards the base 6 and a bottom surface of the base 6; the second air channel is formed between an outer sidewall of the protective body 5 and an inner sidewall of the housing 7; the third air channel is formed between an end surface at a side of the protective body 5 away from the base 6 and an inner wall of an end of the housing 7.

Figure 6:
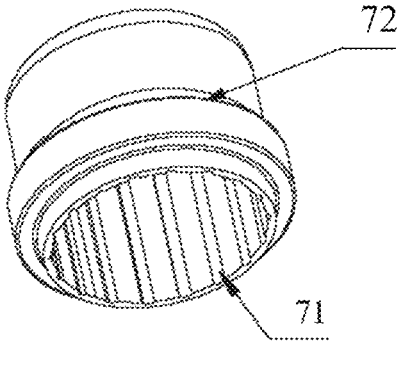
FIG. 6 is a structural schematic diagram illustrating a housing of a tire pressure sensor disclosed in the application.

Furthermore, corresponding structures can be disposed at proper positions on the protective body 5 and the housing 7 respectively to form the above three sections of air channels. For example, a plurality of protrusions 52 can be formed on the end surface at the side of the protective body 5 towards the base 6, and the protrusions 52 can form the first air channel between the protective body 5 and the bottom surface of the base 6. For another example, as shown in FIG. 6, a plurality of grooves 71 can be formed on the inner sidewall of the housing 7, and the grooves 71 can form the second air channel between the outer sidewall of the protective body 5 and the inner sidewall of the housing 7. For another example, a gap portion 53 is formed on the end surface at the side of the protective body 5 away from the base 6, and the gap portion 53 can form the third air channel between the protective body 5 and the inner wall of the end of the housing 7.

It can be understood that the above corresponding structures forming the corresponding air channels are only illustrative and another manner can also be adopted in the solution implementation. For example, for the first air channel, only five protrusions are shown in c of FIG. 7 and there can also be any number of protrusions such as three, four or six or the like. For another example, for the second air channel, a plurality of grooves or protrusions can be formed on the outer sidewall of the protective body 5 (meanwhile, a plurality of protrusions or grooves or a rough annular surface or the like can be disposed on the inner sidewall of the housing 7) to form the second air channel between the outer sidewall of the protective body 5 and the inner sidewall of the housing 7. Furthermore, one or all of the corresponding structures (protrusions, grooves and gap portion and the like) forming the above first air channel, second air channel and third air channel can be disposed, which is not limited in the present disclosure.

In an embodiment, an absolute value of a difference between an included angle (referred to as first included angle) between air flow directions of the second air channel and the first air channel and 90° can be equal or less than a first threshold; and/or, an absolute value of a difference between an included angle (referred to as second included angle) between air flow directions of the second air channel and the third air channel and 90° can be equal or less than a second threshold. It can be understood that since the area of the tire in contact with the ground during the travel of the vehicle continuously changes, the air pressure of the tire at the tire valve is not constant but fluctuates. The above first included angle is used to describe an angle that a path along which the air enters the second air channel from the first air channel changes, and the second included angle is used to describe an angle that a path along which the air enters the third air channel from the second air channel changes. When the absolute value of the first included angle and the second included angle is closer to 90 degrees (right angle), it indicates that the direction-changing amplitude of the air is greater. Hence, when the tire pressure changes significantly (at this time, the air flow rate is larger), the disturbance of the pressure in a previous air channel on the pressure in a next air channel will be smaller, and the pressure transmission process will be smoother. In this solution, by changing the flow direction, the process of the air entering the second air channel from the first air channel and then entering the third air channel from the second air channel can be buffered to some degree and thus the pressure is more stable, which reflects that the detection result by the tire pressure sensor is more accurate, helping avoid sudden change of the detection result.

In some embodiments, because there may be an error with the production and assembling process of the components (protective body 5 and the housing 7), the first threshold and the second threshold can be reasonably set based on actual requirements of the production and assembling accuracy, which is not limited in the present disclosure. In some embodiments, the above first threshold and the second threshold can be set to relatively small (close to 0° as possible), for example, to 5°, 2° or 1° or the like, so as to achieve the followings as possible: the air flow direction of the first air channel is perpendicular to the air flow direction of the second air channel, and the air flow direction of the third air channel is perpendicular to the air flow direction of the second air channel, so as to achieve better buffering effect.

In an embodiment, a buffer recess portion 54 in communication with the air hole 51 is further formed at the end surface at the side of the protective body 5 away from the base 6 to buffer the air flowing through the third air channel into the buffer recess portion. After being buffered in the previous air channels, the air enters the buffer recess portion 54 through the third air channel and impacts the sidewall of the buffer recess portion 54, and thus can be buffered under the action of the sidewall, thus avoiding direct impact on the air hole 51 and the pressure transmission through-hole 61. As a result, the air pressure in the pressure transmission through-hole 61 is relatively stable and the pressure sensing component 31 can measure more accurately.

In an embodiment, the helical antenna 1 and the pressure sensing hole 311 of the pressure sensing component 31 both face toward a side away from the base 6. Through this direction disposal, the blocking of the base 6 and the tire valve 8 for the radio frequency signal output by the helical antenna 1 can be minimized, which helps the tire pressure sensor to have better signal transmission stability and higher signal strength. Although a metal material has great impact on the radio frequency signal, better signal enhancement effect can be achieved through this disposal in a case that at least one of the base 6 and the tire valve 8 is made of a metal material.

Actually, since the pressure sensing component 31 printed (welded) on the printed circuit board 3 has a certain thickness and the structure of battery 4 (usually button cell) is fixed and cannot be perforated, in order to ensure tight connection of the components and save the space as possible, the battery is placed on the back side of the printed circuit board 3 (i.e., a side closer to the base 6) in this solution. Furthermore, in the present solution, because the helical antenna 1 towards a side away from the base 6 (that is, a side where the helical antenna 1 is farther from the base 6 than the battery 4, and at this time, the helical antenna 1 and the battery 4 are located at both sides of the printed circuit board 3 respectively), and the printed circuit board 3 and the battery 4 are not hollow (it is difficult to make a hole in the printed circuit board 3 because the device layout in the circuit may be affected; it is more impossible to make a hole in the shaped battery 4; and due to non-replacement of the battery 4, use of the battery 4 of smaller size will lead to shorter service life of the tire pressure sensor), it is impossible to directly transmit the air pressure through a straight-line air channel formed by a hollow component like the conventional TPMS sensor (the antenna in such sensors is closer to the base than the circuit board). For this reason, in this solution, an air channel (formed by connecting multiple sections) from the pressure transmission through-hole 61 to the pressure sensing hole 311 is disposed as mentioned above, so as to transmit the pressure in the tire to the pressure sensing hole 311 (this hole is located away from the base 6) on the pressure sensing component 31.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

It shall be noted that, in the present disclosure, the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and an apparatus provided by the embodiments of the present disclosure. Specific examples are used herein to set forth the principles and the implementations of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present disclosure shall not be interpreted as limiting to the present disclosure.

What is claimed is:

1. A tire pressure sensor, comprising a sensor assembly obtained through an injection molding process, wherein the sensor assembly comprises a printed circuit board, a battery and a helical antenna assembly;

wherein battery pins of the battery are connected to corresponding power supply pins of the printed circuit board respectively; the helical antenna assembly comprises an antenna support and a helical antenna on an outer sidewall of the antenna support, the antenna support is internally hollow, a helical groove is provided on the outer sidewall of the antenna support, the helical antenna is wound into the helical groove, and a plurality of fasteners for fixing the printed circuit board are at a bottom of the antenna support;

wherein a pressure sensing component and an antenna matching circuit are printed on the printed circuit board, and the antenna matching circuit is configured to transmit to an input end of the helical antenna a radio frequency signal which is output by the pressure sensing component and obtained by the pressure sensing component modulating a sensed tire pressure signal; and wherein there is a wedge-shaped groove adapted to the helical antenna on an upper end of the antenna support, and a line distance of the helical groove is greater than or equal to 0.8 mm and less than or equal to 1.5 mm.

2. The tire pressure sensor of claim 1, wherein the tire pressure sensor further comprises: a protective body wrapping the printed circuit board, the battery and the helical antenna assembly formed during the injection molding process, wherein there is an air hole on the protective body disposed at a position corresponding to a pressure sensing hole of the pressure sensing component.

3. The tire pressure sensor of claim 2, further comprising: a base and a housing mounted on the base, wherein a sealed cavity for accommodating the sensor assembly is formed between the base and the housing, a pressure transmission through-hole in communication with the sealed cavity is provided on the base, and an air channel communicating the pressure transmission through-hole and the air hole is formed inside the sealed cavity.

4. The tire pressure sensor of claim 3, wherein the air channel is formed by sequentially communicating a first air channel, a second air channel and a third air channel, wherein, the first air channel is formed between an end surface at a side of the protective body towards the base and a bottom surface of the base;

the second air channel is formed between an outer sidewall of the protective body and an inner sidewall of the housing; and the third air channel is formed between an end surface at a side of the protective body away from the base and an inner wall of an end of the housing.

5. The tire pressure sensor of claim 4, wherein, a plurality of protrusions are formed on the end surface at the side of the protective body towards the base, and the first air channel between the protective body and the bottom surface of the base is formed by the plurality of protrusions;

a plurality of grooves are formed on the inner sidewall of the housing, and the second air channel between the outer sidewall of the protective body and the inner sidewall of the housing is formed by the plurality of grooves; and/or, a gap portion is formed on the end surface at the side of the protective body away from the base, and the third air channel between the protective body and the inner wall of the end of the housing is formed by the gap portion.

6. The tire pressure sensor of claim 4, wherein, an absolute value of a difference between an included angle between air flow directions of the second air channel and the first air channel and 90° is equal or less than a first threshold; and/or, an absolute value of a difference between an included angle between air flow directions of the second air channel and the third air channel and 90° is equal or less than a second threshold;

wherein the first threshold and the second threshold are set to be less than or equal to 5°.

7. The tire pressure sensor of claim 3, wherein a buffer recess portion in communication with the air hole is further formed at an end surface at a side of the protective body away from the base.

8. The tire pressure sensor of claim 3, wherein the helical antenna and the pressure sensing hole of the pressure sensing component both face toward a side away from the base.

9. The tire pressure sensor of claim 1, wherein, the sensor assembly is integrally formed by the printed circuit board, the battery and the helical antenna assembly through the injection molding process; or, a plurality of injection molding accessories are obtained by the printed circuit board, the battery and the helical antenna assembly through the injection molding process and then spliced to form the sensor assembly.

10. The tire pressure sensor of claim 1, wherein the pressure sensing component is a sensor chip integrated with a pressure sensing component.

11. The tire pressure sensor of claim 10, wherein the sensor chip is further integrated with a temperature sensing component, an acceleration sensing component and/or an angle sensing component.

12. The tire pressure sensor of claim 1, wherein the radio frequency signal which is output by the pressure sensing component and obtained by the pressure sensing component modulating the sensed tire pressure signal comprises:

a frequency-shift keying (FSK) signal output by performing FSK modulation on the tire pressure signal; or, an amplitude shift keying (ASK) signal output by performing ASK modulation on the tire pressure signal.

13. The tire pressure sensor of claim 1, wherein the helical antenna comprises a first pin and a second pin, the first pin is used as an input end of the helical antenna and the second pin is suspended, wherein, an axial groove is on the antenna support, there is a welding hole on the printed circuit board disposed at a position vertically corresponding to the axial groove, and the first pin is welded through the welding hole to an output end of the antenna matching circuit.

14. The tire pressure sensor of claim 1, wherein the battery is a button cell and a specification of the button cell is BR1632, CR1632, BR1620, CR1620, BR1225, CR1225, BR1220 or CR1220.

15. A tire valve, comprising a tire pressure sensor, wherein, the tire pressure sensor comprises a sensor assembly obtained through an injection molding process, and the sensor assembly comprises a printed circuit board, a battery and a helical antenna assembly;

wherein battery pins of the battery are connected to corresponding power supply pins of the printed circuit board respectively; the helical antenna assembly comprises an antenna support and a helical antenna on an outer sidewall of the antenna support, the antenna support is internally hollow, a helical groove is provided on the outer sidewall of the antenna support, the helical antenna is wound into the helical groove, and a plurality of fasteners for fixing the printed circuit board are at a bottom of the antenna support;

wherein a pressure sensing component and an antenna matching circuit are printed on the printed circuit board, and the antenna matching circuit is configured to transmit to an input end of the helical antenna a radio frequency signal which is output by the pressure sensing component and obtained by the pressure sensing component modulating a sensed tire pressure signal; and wherein there is a wedge-shaped groove adapted to the helical antenna on an upper end of the antenna support, and a line distance of the helical groove is greater than or equal to 0.8 mm and less than or equal to 1.5 mm.

16. The tire pressure sensor of claim 1, wherein there is an axial groove penetrating through an upper end and a lower end on an outer sidewall of the antenna support, the axial groove is longitudinally intersected with the helical groove, and a first pin of the helical antenna is adapted to the axial groove, and there is a position limiting piece adapted to the helical antenna on the upper end of the antenna support.

17. The tire pressure sensor of claim 1, wherein a wire of the helical antenna has a diameter greater than or equal to 0.3 mm and less than or equal to 0.7 mm.

18. The tire pressure sensor of claim 1, wherein the injection molding process is a low-pressure injection molding process.

19. The tire pressure sensor of claim 1, wherein an injection molding material of the low-pressure injection molding process is thermoplastic polyamide.

* * * * *